United States Patent
Koseki et al.

(10) Patent No.: US 12,482,609 B2
(45) Date of Patent: *Nov. 25, 2025

(54) ELECTROLYTIC CAPACITOR, NEGATIVE ELECTRODE BODY AND METHOD FOR PRODUCING ELECTROLYTIC CAPACITOR

(71) Applicant: NIPPON CHEMI-CON CORPORATION, Tokyo (JP)

(72) Inventors: Kazuya Koseki, Kanagawa (JP); Kazuma Okura, Kanagawa (JP); Kazuhiro Nagahara, Tokyo (JP)

(73) Assignee: NIPPON CHEMI-CON CORPORATION (JP)

( * ) Notice: Subject to any disclaimer, the term of this patent is extended or adjusted under 35 U.S.C. 154(b) by 49 days.

This patent is subject to a terminal disclaimer.

(21) Appl. No.: 18/572,685

(22) PCT Filed: Jun. 21, 2022

(86) PCT No.: PCT/JP2022/024656
§ 371 (c)(1),
(2) Date: Dec. 20, 2023

(87) PCT Pub. No.: WO2022/270493
PCT Pub. Date: Dec. 29, 2022

(65) Prior Publication Data
US 2024/0290550 A1    Aug. 29, 2024

(30) Foreign Application Priority Data
Jun. 22, 2021 (JP) .............................. 2021-103415

(51) Int. Cl.
*H01G 9/042* (2006.01)
*H01G 9/00* (2006.01)
(Continued)

(52) U.S. Cl.
CPC ......... *H01G 9/0425* (2013.01); *H01G 9/0029* (2013.01); *H01G 9/055* (2013.01); *H01G 9/145* (2013.01)

(58) Field of Classification Search
CPC ...... H01G 9/0029; H01G 9/145; H01G 9/055; H01G 9/042; H01G 9/0425
See application file for complete search history.

(56) References Cited

U.S. PATENT DOCUMENTS

| 2008/0247120 A1 | 10/2008 | Mori et al. |
| 2018/0047511 A1 | 2/2018 | Tsuda |

(Continued)

FOREIGN PATENT DOCUMENTS

| JP | 2006-108159 A | 4/2006 |
| JP | 2006190878 A | 7/2006 |

(Continued)

OTHER PUBLICATIONS

International Search Report mailed Sep. 27, 2022 for International Patent Application No. PCT/JP2022/024656.

(Continued)

*Primary Examiner* — David M Sinclair
(74) *Attorney, Agent, or Firm* — Snell & Wilmer LLP

(57) ABSTRACT

An electrolytic capacitor that can suppress a decrease over time of capacity, a cathode body included in the electrolytic capacitor, and a production method of the electrolytic capacitor are provided. The electrolytic capacitor includes an anode foil, a cathode body, and electrolytic solution. The anode foil is formed of valve metal and has dielectric oxide film formed on a surface of the foil. The cathode body includes cathode foil formed of valve metal and a carbon layer laminated on the cathode foil. An interfacial resistance between the cathode foil and the carbon layer is 1.8 m$\Omega \cdot$cm$^2$ or less.

9 Claims, 1 Drawing Sheet

(51) Int. Cl.
    *H01G 9/055*     (2006.01)
    *H01G 9/145*     (2006.01)

(56) References Cited

U.S. PATENT DOCUMENTS

| 2021/0193395 A1* | 6/2021 | Koseki | H01G 9/042 |
| 2024/0290549 A1* | 8/2024 | Osuga | H01G 9/145 |

FOREIGN PATENT DOCUMENTS

| WO | 2006073014 A1 | 7/2006 |
| WO | 2016174806 A1 | 11/2016 |
| WO | 2020059609 A1 | 3/2020 |

OTHER PUBLICATIONS

The European Search Report or the Supplementary European Search Report dated May 7, 2025 in a corresponding European patent application No. 22828410.5; 5 pages.

The European examination communication dated May 19, 2025 in a corresponding European patent application No. 22828410.5; 6 pages.

Japanese Notice of Reasons for Refusal dated Jul. 8, 2025 for corresponding Japanese Application No. 2021-103415; 7 pages.

Japanese Examination Report dated Sep. 30, 2025 for corresponding Japanese Application No. 2021-103415; 7 pages.

\* cited by examiner

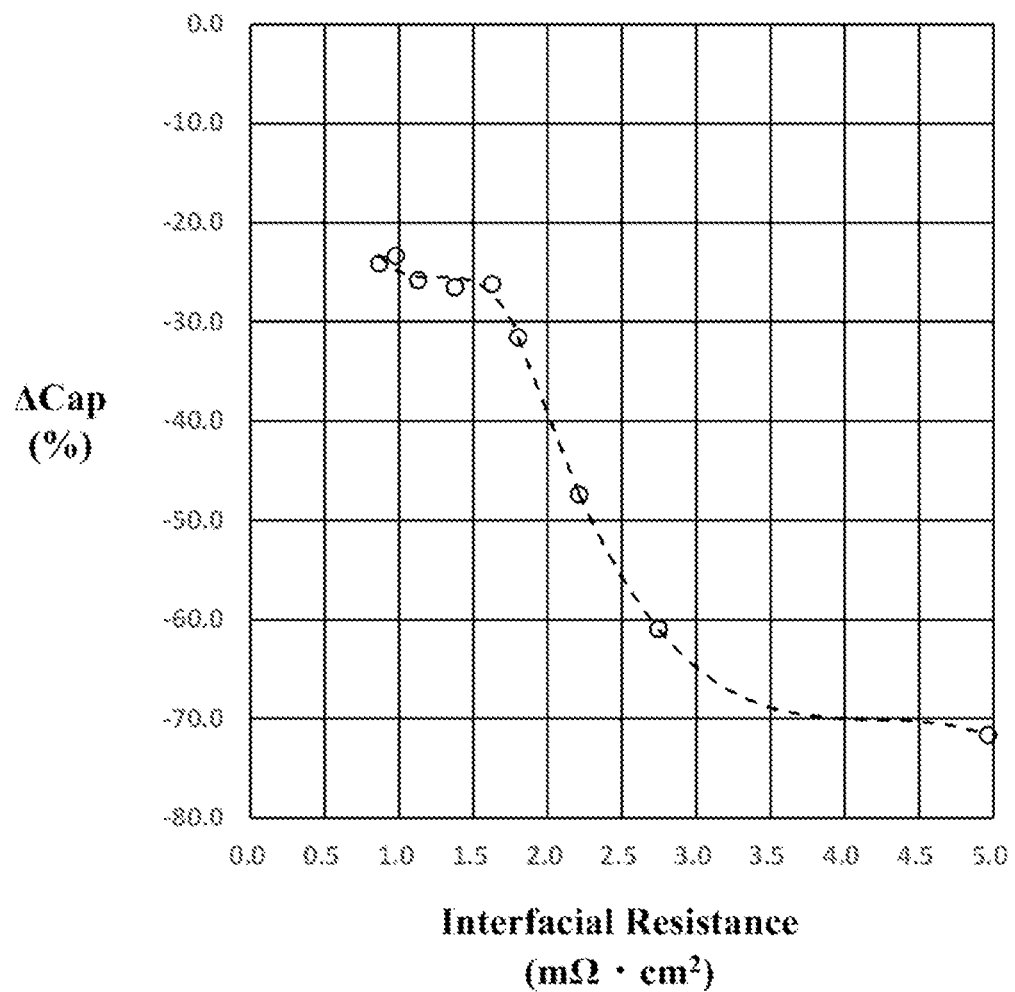

ELECTROLYTIC CAPACITOR, NEGATIVE ELECTRODE BODY AND METHOD FOR PRODUCING ELECTROLYTIC CAPACITOR

FIELD OF INVENTION

The present disclosure relates to an electrolytic capacitor, a cathode body included in the electrolytic capacitor, and a production method of the electrolytic capacitor.

BACKGROUND

The electrolytic capacitor is formed by anode foil in which dielectric oxide film is formed on valve metal such as tantalum or aluminum, and cathode foil formed of foil made of the same or different metal facing each other. Electrolytic solution intervenes between the anode foil and the cathode foil. The electrolytic solution intervenes between the anode foil and the cathode foil and closely contacts with an uneven surface of the anode foil, and acts as a true cathode.

In recent years, electrolytic capacitors in which a solid electrolyte is intervened between the anode foil and the cathode foil instead of electrolytic solution is widely used. The electrolytic capacitors with solid electrolytes are compact, large capacity, low equivalent series resistance, and are essential for downsizing and high functionality of electronic devices. Manganese dioxide and 7,7,8,8-tetracyanoquinodimethane (TCNQ) complex are known as solid electrolytes. In addition, conductive polymers derived from monomers with conjugated double bonds are rapidly becoming popular as solid electrolytes. For example, conductive polymers may be poly(3,4-ethylenedioxythiophene) (PEDOT). Conductive polymers express high conductivity when using polyanions such as organic sulfonic acid and the like as a dopant and express excellent adhesion to dielectric oxide film in chemical oxidative polymerization or electrolytic oxidative polymerization.

However, the electrolytic capacitors with solid electrolytes are less effective in repairing defect in the dielectric oxide film than the electrolytic capacitors with electrolytic solution. So-called hybrid-type electrolytic capacitors in which a solid electrolyte is intervened between the anode foil and the cathode foil and a capacitor element is impregnated with electrolytic solution is getting attention.

Here, in the electrolytic capacitor, not only the dielectric oxide film is intentionally formed on the anode foil, but oxide film is also formed on a surface of the cathode foil due to the reaction with air and the chemical reaction of the electrolytic solution. Therefore, the electrolytic capacitor can be regarded as a series capacitor in which Cap (capacitance) is expressed at the anode side and the cathode side. It is important for such electrolytic capacitors to ideally asymptote the capacity at the cathode side to efficiently draw out the capacity at the anode side.

Therefore, an electrolytic capacitor in which carbon is formed on the surface of the cathode foil using dry plating such as ion plating is suggested (for example, refer Patent Document 1). Since the carbon layer prevents the penetration of the electrolytic solution into the surface of the cathode foil and prevents the formation and growing of new oxide film on the cathode foil, the capacity expressed at the cathode side is asymptoted substantially infinitely and the capacity of the electrolytic capacitor becomes only the anode capacity.

PRIOR ART DOCUMENT

Patent Document

Patent Document 1: JP2006-190878A

SUMMARY OF INVENTION

Problems to be Solved by Invention

However, just simply forming the carbon layer on the cathode foil makes the capacity of the electrolytic capacitor deteriorate over long period of time until finally the decrease rate of the capacity of the electrolytic capacitor falling under the limit, meaning that the electrolytic capacitor ended its lifetime.

The present disclosure has been proposed to address the above problems, and an objective of the present disclosure is to provide an electrolytic capacitor in which deterioration over time of the capacity is suppressed, a cathode body included in the electrolytic capacitor, and a manufacturing method of the electrolytic capacitor.

Means to Solve the Problem

The inventors have researched and found the following knowledge. That is, when the carbon layer is laminated on the cathode foil, it is observed that if the interfacial resistance between the cathode foil and the carbon layer is at least 1.8 m$\Omega \cdot$cm$^2$ or less, a decrease rate of the capacity of the electrolytic capacitor is suppressed to 30% or less relative to the initial capacity.

Based on this knowledge, to address the above-described problem, an electrolytic capacitor of the present disclosure is an electrolytic capacitor including: anode foil, a cathode body, and electrolytic solution, in which the anode foil is formed of valve metal and has dielectric oxide film formed on a surface thereof, the cathode body includes cathode foil formed of valve metal and a carbon layer laminated on the cathode foil, and an interfacial resistance between the cathode foil and the carbon layer is 1.8 m$\Omega \cdot$cm$^2$ or less.

Furthermore, the inventors have researched and found the further following knowledge. That is, when the carbon layer is laminated on the cathode foil, it is observed that a decrease rate of the capacity due to deterioration over time largely varied at the interfacial resistance between the cathode foil and the carbon layer of at least 1.6 m$\Omega \cdot$cm$^2$ or less. In fact, when the interfacial resistance between the cathode foil and the carbon layer is about 1.63 m$\Omega \cdot$cm$^2$ or less, the deterioration over time of the capacity of the electrolytic capacitor is excellently suppressed in comparison with when the interfacial resistance was more than about 1.63 m$\Omega \cdot$cm$^2$.

Based on this further knowledge, the interfacial resistance between the cathode foil and the carbon layer may be 1.6 m$\Omega \cdot$cm$^2$ or less.

The cathode foil may have an enlarged surface layer on a surface thereof and have the carbon layer on the enlarged surface layer. When the enlarged surface layer is formed in addition to the carbon layer, the cathode foil and the carbon layer adhere to each other due to the anchor effect produced by carbon entering recesses in the unevenness in the enlarged surface layer, so that the interfacial resistance between the cathode foil and the carbon layer can be reduced easier.

The carbon layer may be pressure-welded to the cathode foil. When the carbon layer is formed and is pressure-welded on the cathode foil, the interfacial resistance between the cathode foil and the carbon layer can be reduced easier. Note that it is further preferable to perform both the pressure-welding of the carbon layer to the cathode foil and the formation of the enlarged surface layer to the cathode foil. When the carbon layer is pressure-welded to the cathode foil on which the enlarged surface layer is formed, the carbon material of the carbon layer is pressed into pores in the unevenness of the enlarged surface layer and the carbon layer deforms along an uneven surface of the enlarged surface layer, so that the adhesion and fixity of the carbon layer and the cathode foil is further improved. Therefore, the interfacial resistance between the cathode foil and the carbon layer can be reduced easier.

Furthermore, to address the above-described problem, a cathode body of the electrolytic capacitor is also one aspect of the present disclosure, and the cathode body includes cathode foil and a carbon layer formed on the cathode foil, and an interfacial resistance between the cathode foil and the carbon layer is 1.8 m$\Omega \cdot$cm$^2$ or less.

The interfacial resistance between the cathode foil and the carbon layer may be 1.6 m$\Omega \cdot$cm$^2$ or less.

Furthermore, to address the above-described problem, a manufacturing method of the electrolytic capacitor is one aspect of the present disclosure, and the manufacturing method of the electrolytic capacitor including the anode foil, the cathode body, and the electrolytic solution includes: a cathode body production process of forming a carbon layer on cathode foil formed of valve metal and pressure-welding the carbon layer to the cathode foil by pressing until an interfacial resistance therebetween becomes 1.8 m$\Omega \cdot$cm$^2$ or less to produce a cathode body, and a capacitor element production process of arranging the anode foil on which dielectric oxide film is formed on a surface and the cathode body produced in the cathode body production process to face each other to produce a capacitor element, and an impregnation process of impregnating the capacitor element with the electrolytic solution.

In the cathode body production process, the carbon layer may be pressure-welded to the cathode foil by press processing until the interfacial resistance becomes 1.6 m$\Omega \cdot$cm$^2$ or less.

Effect of Invention

According to the present disclosure, an electrolytic capacitor that can suppress the deterioration over time of the capacity can be provided.

BRIEF DESCRIPTION OF DRAWINGS

FIG. 1 is a graph indicating the relationship between an interfacial resistance and a change rate of the capacity ($\Delta$Cap).

EMBODIMENTS

Hereinafter, an electrolytic capacitor and the manufacturing method thereof according to the embodiment of the present disclosure will be described. Note that the present disclosure is not limited to the following embodiments.
(Overall Configuration)

An electrolytic capacitor is a passive element that gains the capacitance by the dielectric polarization of dielectric oxide film and stores and discharges electric charge by the capacitance. The electrolytic capacitor includes anode foil on which dielectric oxide film is formed on a surface, a cathode body, an electrolytic solution, and a separator. The anode foil and the cathode body are arranged to face each other, and the electrolytic solution and the separator are intervened between the anode foil and the cathode body. The anode foil and the cathode body are arranged in a laminated-type in which they are laminated alternately via the separator, or arranged in a wound-type in which they are wound via the separator. A solid electrolyte layer may be arranged between the anode foil and the cathode body, in addition to the electrolytic solution.
(Electrode Foil)

The cathode body includes cathode foil. The anode foil and the cathode foil of the cathode body are foil bodies formed of valve metal. The valve metal is aluminum, tantalum, niobium, niobium oxide, titanium, hafnium, zirconium, zinc, tungsten, bismuth, and antimony, etc. The purity of the anode foil is desirably 99.9% or more, and the purity of the cathode foil is desirably about 99% or more, however, impurities such as silicon, iron, copper, magnesium, and zinc may be included.

An enlarged surface layer with an enlarged surface structure is formed on one surface or both surface of the anode foil and the cathode foil. The enlarged surface layer is formed by electrolytic etching, chemical etching, or sand-blasting, and the like, or formed by vapor-depositing or sintering metal particles and the like, on a foil body. That is, the enlarged surface layer is formed by tunnel-shaped etching pits, spongy pits, or air gaps between dense powder. The electrolytic etching may be DC etching or AC etching in which direct current or alternating current is applied in acidic aqueous solution with halogen ions, such as hydrochloric acid. Furthermore, in the chemical etching, the anode foil and the cathode foil are immersed in acidic solution or alkaline solution. Note that the tunnel-shaped etching pits may be formed in a length that penetrates through the foil or a length that does not reach the center of the foil.

Typically, the dielectric oxide film of the anode foil is oxide film formed on a surface layer of the anode foil. For example, when the anode foil is aluminum foil, the dielectric oxide film is aluminum oxide obtained by oxidizing the surface layer of the enlarged surface layer. The dielectric oxide film is intentionally formed by chemical conversion treatment in which voltage is applied in solution without halogen ions such as aqueous solution of adipic acid, boric acid or phosphoric acid, etc. Also, the oxide film may be naturally or intentionally formed on the surface layer of the cathode foil by this chemical conversion treatment. The natural oxide film that was naturally formed on the surface layer of the cathode foil is formed when oxygen in the air reacts with the cathode foil.
(Cathode Body)

The cathode body includes a carbon layer in addition to the cathode foil. The carbon layer is laminated on the cathode foil. The carbon layer is a layer including carbon material. The carbon material is fibrous carbon, carbon powder, or a mixture thereof. It is preferable that the fibrous carbon or the carbon powder is subjected to porous treatment such as activation treatment or opening treatment to form pores.

For example, the carbon powder is natural plant tissue such as coconut shell, synthetic resin such as phenol, activated carbon made from fossil fuel such as coal, coke, pitch, and the like, carbon black such as Ketjen black, acetylene black, channel black, or thermal black, carbon nanohorn, amorphous carbon, natural graphite, artificial graphite, graphitized Ketjen black, and mesoporous carbon, etc. For example, the fibrous carbon is carbon nanotube, or carbon nanofiber, etc. The carbon nanotube may be single-walled carbon nanotube with a single layer of a graphene sheet, or multi-walled carbon nanotube (MWCNT) in which two or more layers of graphene sheets are curled up on a same axis and a tube wall forms multiple layers.

It is preferable that the carbon layer is formed so that the interfacial resistance between the carbon layer and the cathode foil becomes at least 1.6 mΩ·cm² or less. When the interfacial resistance is 1.6 mΩ·cm² or less, the decrease rate over time of the capacity of the electrolytic capacitor can be suppressed low. In contrast, when the interfacial resistance is more than 1.6 mΩ·cm², the decrease rate of the capacity of the electrolytic capacitor drastically increases.

It is assumed that the phenomenon in which the decrease rate over time of the capacity significantly changes at above and below the interfacial resistance of 1.6 mΩ·cm² occurs for the following reason, however, it is not limited thereto. That is, the interfacial resistance between the carbon layer and the cathode foil correlates with the diameter and volume of pores between the carbon layer and the cathode foil. In addition, the interfacial resistance of 1.6 mΩ·cm² or less corresponds to gaps of the diameter and volume in which the electrolytic solution hardly enters between the carbon layer and the cathode foil and cannot contact with the surface of the cathode foil. Therefore, when the interfacial resistance is 1.6 mΩ·cm² or less, the growing of the oxide film on the cathode foil is suppressed and large capacity at the cathode side is maintained. If the large capacity at the cathode side is maintained, the capacity can be efficiently continuously drawn out from the anode side, and the decrease rate over time of the capacity of the electrolytic capacitor can be suppressed low.

However, when interfacial resistance between the carbon layer and the cathode foil is more than 1.63 mΩ·cm² and 1.8 mΩ·cm² or less, the decrease rate of the capacity of the electrolytic capacitor rapidly increased, but was suppressed to 30% or less relative to the initial decrease rated of the capacity of the electrolytic capacitor. The initial means before the load test under a high-temperature environment in which the electrolytic capacitor is exposed under the temperature environment of 125° C. and DC voltage of 2.4 V is applied. Therefore, the interfacial resistance between the carbon layer and the cathode foil is set to be at least 1.8 mΩ·cm² or less.

Press processing to pressure-weld the carbon layer and the cathode foil can be employed and is preferable for the adjustment method of the interfacial resistance between the carbon layer and the cathode foil. In the press processing, a laminate body of the carbon layer and the cathode foil is sandwiched by a press roller, and press linear pressure is applied. The press linear pressure is desirably about 0.01 to 100 t/cm. In addition, press temperature that is temperature of the press roller at the time of the pressing is desirably about 0 to 200° C.

Note that the carbon layer is formed on the cathode foil by vacuum vapor-deposition, sputtering, ion plating, CVD, application, electrolytic plating, or electroless plating, and the like before the press processing. In a case of the application, carbon material is dispersed in a dispersion solvent to form a slurry, and the slurry is applied and dried on the cathode foil by slurry casting, doctor blading, or spray spraying, etc. In a case of the vacuum vapor-deposition, carbon material is evaporated by electrical heating in vacuum or is evaporated by electron beam irradiation in vacuum, and film of the carbon material is formed on the cathode foil. Furthermore, in the case of the sputtering, the cathode foil and a target formed of carbon material are placed in a vacuum container, inert gas is introduced into the vacuum container, and voltage is applied to bombard the target with the plasma inert gas, so that particles of carbon material beaten out from the target is deposited on the cathode foil.

Furthermore, to reduce the interfacial resistance of the carbon layer and the cathode foil, it is preferable to intentionally form the oxide film of about 0.5 V to 3V on the cathode foil by chemical conversion treatment. The oxide film formed on the cathode foil may reduce the capacity of the electrolytic capacitor and may improve the adhesion of the carbon layer and the cathode foil. When the carbon layer is formed on the cathode foil with the oxide film of about 0.5 V to 3 V, the adhesion is improved strongly than the oxide film beyond this range, and the interfacial resistance between the carbon layer and the cathode foil easily decreases to 1.6 mΩ·cm² or less. Therefore, when the oxide film of about 0.5 V to 3 V is intentionally formed on the cathode foil, the effect of the decrease in capacity due to the oxide film is outweighed, and the decrease in the capacitance of the electrolytic capacitor can be suppressed.

Furthermore, the enlarged surface layer may be formed on the surface of the cathode foil to adjust the interfacial resistance between the carbon layer and the cathode foil. By forming the enlarged surface layer on the surface of the cathode foil, carbon material of the carbon layer enters the unevenness of the enlarged surface layer, and the interfacial resistance between the carbon layer and the cathode foil can be reduced. By press processing the carbon layer and the cathode foil after forming the enlarged surface layer on the cathode foil, the interfacial resistance can be more easily reduced.

Furthermore, carbon material included in the carbon layer may be selected to adjust the interfacial resistance between the carbon layer and the cathode foil. The carbon material is preferably carbon black that is spherical carbon. By using spherical carbon black with average primary particle diameter of 100 nm or less, the carbon layer becomes dense and can easily adhere to the enlarged surface layer, facilitating the reduction of the interfacial resistance.

Furthermore, the carbon material included in the carbon layer may be flake or vein graphite and carbon black that is spherical carbon. It is preferable that the flake or vein graphite has an aspect ratio between short and long diameters of 1:5 to 1:100. When the carbon layer including this combination of the carbon material is laminated on the cathode foil, is compressed, and is pressure-welded to the enlarged surface layer, carbon black becomes easier to be rubbed into the enlarged surface layer by graphite. Graphite easily deforms along an uneven surface of the enlarged surface layer and can be easily laminated on the uneven surface. Accordingly, graphite acts as a pressing lid that presses and holds the spherical carbon inside the enlarged surface layer. Therefore, the interfacial resistance between the carbon layer and cathode foil can be reduced easier.

Note that the interfacial resistance can be measured as described below. That is, potential of the surface of the carbon layer of the cathode body on which the carbon layer is formed is measured at a plurality of points. The surface of the carbon layer where the potential is measured is a surface opposite the surface adhering with the cathode foil or an exposed surface of the cathode body. To measure the potential, a test needle for application and a test needle for measurement are contacted with the surface of the carbon layer, and resistance calculated when applying predetermined DC current between the test needles is the "interfacial resistance in the cathode". For example, a suitable apparatus to measure the interfacial resistance in the cathode may be the electrode resistance measurement system RM2610 from HIOKI E.E. CORPORATION.

(Electrolytic Solution)

The solvent of the electrolytic solution is water, a protic organic polar solvent, or an aprotic organic polar solvent, and may be used in single or in combination of two or more. The solute includes anion components or cation components. Typically, the solute is organic acid salt, inorganic acid salt, or salt of composite compound of organic acid and inorganic acid, and may be used in single or in combination of two or more. Acid that is the anion and base that is the cation may be separately added to the electrolytic solution as solute components.

The protic organic polar solvent may be monohydric alcohol, polyhydric alcohol, and oxyalcohol compound, etc. The monohydric alcohol may be ethanol, propanol, butanol, pentanol, hexanol, cyclobutanol, cyclopentanol, cyclohexanol, benzyl alcohol, etc. Polyhydric alcohol and oxyalcohol compounds may be ethylene glycol, propylene glycol, glycerin, methyl cellosolve, ethyl cellosolve, methoxypropylene glycol, dimethoxypropanol, etc.

The representative aprotic organic polar solvent may be sulfones, amides, lactones, cyclic amides, nitriles, and sulfoxides, etc. The sulfone may be dimethyl sulfone, ethylmethyl sulfone, diethyl sulfone, sulfolane, 3-methyl sulfolane, 2,4-dimethyl sulfolane, etc. The amide may be N-methylformamide, N, N-dimethylformamide, N-ethylformamide, N, N-diethylformamide, N-methylacetamide, N, N-dimethylacetamide, N-ethylacetamide, N, N-diethylacetamide and hexamethylphosphoricamide, etc. The lactone and the cyclic amide may be γ-butyrolactone, γ-valerolactone, δ-valerolactone, N-methyl-2-pyrrolidone, ethylene carbonate, propylene carbonate, butylene carbonate, and isobutylene carbonate, etc. The nitrile may be acetonitrile, 3-methoxypropionitrile, and glutaronitrile, etc. The sulfoxide may be dimethyl sulfoxide, etc.

Organic acid may be oxalic acid, succinic acid, glutaric acid, pimelic acid, suberic acid, sebacic acid, phthalic acid, isophthalic acid, terephthalic acid, maleic acid, adipic acid, benzoic acid, and toluyl acid, enanthic acids, malonic acids, carboxylic acids such as 1,6-decandicarboxylic acid, 1,7-octanedicarboxylic acid, azelaic acid, undecanedioic acid, dodecanedioic acid, tridecanedioic acid, phenols and sulfonic acids, etc. The inorganic acid may be boric acid, phosphoric acid, phosphorus acid, hypophosphorous acid, carbonic acid, and silicic acid, etc. The composite compound of organic acid and inorganic acid be may borodisalicylic acid, borodioxalic acid, and borodiglycolic acid.

At least one salt of the organic acid, the inorganic acid, and the composite compound of organic acid and inorganic acid may be ammonium salt, quaternary ammonium salt, quaternary amidinium salt, amine salt, sodium salt, and potassium salt, etc. Quaternary ammonium ion of the quaternary ammonium salt may be tetramethylammonium, triethylmethylammonium, and tetraethylammonium, etc. The quaternary amidiniums may be ethyldimethylimidazolinium and tetramethylimidazolinium, etc. Amines in the amine salt may be primary amines, secondary amines, and tertiary amines. The primary amine may be methylamine, ethylamine, propylamine, and the like, the secondary amines may be dimethylamine, diethylamine, ethylmethylamine and dibutylamine, and the like, and the tertiary amines may be trimethylamine, triethylamine, tripropylamine, tributylamine, ethyldimethylamine, and ethyldiisopropylamine, and the like. Ion dissociation salt having the anion component that is the organic salt, the inorganic salt, and the composite compound of organic salt and inorganic salt, and the cation component that is the base may be added to the electrolytic solution.

Furthermore, other additives may be added to the electrolytic solution. The additive may be polyethylene glycol, complex compounds of boric acid and polysaccharides (mannit, sorbit, etc.), complex compounds of boric acid and polyhydric alcohol, borate esters, nitro compounds, phosphate esters, and colloidal silica, etc. These may be used in single or in combination of two or more. The nitro compound suppresses an amount of hydrogen gas produced in the electrolytic capacitor. The nitro compound may be o-nitrobenzoic acid, m-nitrobenzoic acid, p-nitrobenzoic acid, o-nitrophenol, m-nitrophenol, and p-nitrophenol, etc.

After the preparation, such electrolytic solution is impregnated in the capacitor element. The capacitor element is formed by facing the anode foil on which the dielectric oxide film is formed and a cathode body in which the carbon layer is laminated on the cathode foil via the separator. At the time of the impregnation, depressurization process or pressurization process may be performed to facilitate the impregnation of the electrolytic solution to the capacitor element, if necessary. The impregnation process may be repeated for multiple times. Note that, when using the solid electrolyte layer together, the electrolytic solution is impregnated in the capacitor element on which the solid electrolyte layer is formed.

The solid electrolyte layer includes conductive polymers. The conductive polymer is a conjugated polymer or a doped conjugated polymer. The conjugated polymer is obtained by chemical oxidative polymerization or electrolytic oxidative polymerization of monomers with a n-conjugated double bond or a derivative thereof. The conductive polymer expresses high conductivity by the doping to the conjugated polymer.

As the conjugated polymer, known polymers may be used without limitation. For example, the conjugated polymer may be polypyrrole, polythiophene, polyfuran, polyaniline, polyacetylene, polyphenylene, polyphenylenevinylene, polyacene, and polythiophenevinylene, etc. Representatively, the conductive polymer may be poly(3,4-ethylenedioxythiophene), which is called PEDOT, doped with polystyrene sulfonic acid (PSS). These conjugated polymers may be used in single or in combination of two or more, and may further be a copolymer of two or more kinds of monomers.

As dopants, known dopants may be used without limitation. For example, the dopant may be inorganic acid such as boric acid, nitric acid, and phosphoric acid, and organic acid such as acetic acid, oxalic acid, citric acid, ascot acid, tartaric acid, squaric acid, logisonic acid, croconic acid, salicylic acid, p-toluenesulfonic acid, 1,2-dihydroxy-3,5-benzenedisulfonic acid, methanesulfonic acid, trifluoromethanesulfonic acid, borodisalicylic acid, bisoxalate borate acid, sulfonylimide acid, dodecylbenzenesulfonic acid, propylnaphthalenesulfonic acid, and butylnaphthalenesulfonic acid. Polyanions may be used as the dopant, and the polyanion may be polyvinyl sulfonic acid, polystyrene acid, polyallyl sulfonic acid, polyacrylic sulfonic acid, polymethacrylic sulfonic acid, poly (2-acrylamide-2-methylpropanesulfonic acid), polyisoprene sulfonic acid, and polyacrylic acid, polymethacrylic acid, and polymaleic acid, etc. The dopant may be used in single or in combination of two or more. Furthermore, the dopant may also be polymers or monomers.

The solid electrolyte layer is formed by impregnating the capacitor element with dispersion in which the conductive polymer is dispersed. The solvent of the dispersion may be any solvent if particles or powder of the conductive polymer are dispersed, and water is mainly used. Ethylene glycol may be used as the solvent of the dispersion, if necessary. It was found that when ethylene glycol is used as the solvent of the dispersion, especially the ESR characteristic among the electrical characteristic of the product can be reduced. Note that to improve the impregnation performance and electrical conductivity of the dispersion, various additives may be used for the dispersion, and the dispersion may be neutralized by adding cations.

For the impregnation method of the dispersion of the conductive polymer, the capacitor element may be immersed in the dispersion, or dropwise application or spray application and the like may be employed. Furthermore, the impregnation is not limited to the entire pair of the electrodes, and the capacitor element may be assembled after the anode foil and the cathode body is impregnated with the dispersion. Depressurization process or pressurization process may be performed to facilitate the impregnation of the dispersion to a pair of the electrodes, if necessary. This adhesion process may be repeated for multiple times.

Furthermore, the solid electrolyte layer may be formed by known electrolytic polymerization or chemical polymerization. In the chemical polymerization, the solid electrolyte layer is formed by impregnating the capacitor element with solution in which monomers and oxidizing agents are dissolved in the solvent and drying the capacitor element, or by alternating impregnating the capacitor element with solution in which monomers are dissolved in a solvent and solution in which oxidizing agents are dissolved in the solvent and drying the capacitor element. For example, the solid electrolyte is formed by immersing the capacitor element in the mixture solution of the polymerizable monomer and the oxidizing agent and heating the capacitor element to cause the polymerization reaction of the conductive polymer, wherein 3,4-ethylenedioxythiophene is used as the polymerizable monomer and alcohol solution (for example, ethanol) of ferric p-toluenesulfonate is used as the oxidizing agent. Furthermore, a rinsing process to remove unreacted monomers and excessive monomers by rinsing may be performed before and after the heating process.

In the electrolytic polymerization, the solid electrolyte layer is formed by introducing the capacitor element into the electrolytic polymerization solution at least including monomers, supporting electrolytes, and solvents and applying voltage between the anode and the cathode. Monomer that gains conductivity by the electrolytic polymerization may be used for the electrolytic polymerization solution. Thiophene monomers and pyrrole monomers are suitable for the monomers. When using these monomers, the capacitor element is immersed in the electrolytic polymerization solution containing the monomers and sodium 1-naphthalenesulfonate that is the supporting electrolyte in the stainless container, and the predetermined voltage is applied. By this, the solid electrolyte layer by the water-soluble monomers (for example, thiophene and pyrrole) by the electrolytic polymerization can be uniformly formed.

(Separator)

The separator includes cellulose such as kraft, Manila hemp, esparto, hemp, and rayon, and mixed papers thereof, polyester resin such as polyethylene terephthalate, polybutylene terephthalate, polyethylene naphthalate, and derivatives thereof, polytetrafluoroethylene resin, polyvinylidene fluoride resin, vinylon resin, aliphatic polyamide, semi-aromatic polyamide, polyamide resin such as total aromatic polyamide, polyimide resin, polyethylene resin, polypropylene resin, trimethylpentene resin, polyphenylene sulfide resin, acrylic resin, polyvinyl alcohol resin and the like, and these resins may be used in single or in combination.

Note that the separator holds the solid electrolyte layer and the electrolytic solution and prevents short-circuit of the anode foil and the cathode body. The separator may not be provided if the solid electrolyte layer can keep its shape, each portion of the capacitor element including the solid electrolyte layer can hold the electrolytic solution, and the solid electrolyte layer has thickness enough to prevent short-circuit of the anode foil and the cathode foil without the separator.

(Manufacturing Method)

Such an electrolytic capacitor is manufactured via an anode foil production process of producing the anode foil, a cathode body production process of producing the cathode body, a capacitor element production process of producing the capacitor element in which the anode foil and the cathode body face each other, a solid electrolyte layer formation process of forming the solid electrolyte layer on the capacitor element, and an electrolytic solution impregnation process of impregnating the capacitor element on which the solid electrolyte layer is formed with the electrolytic solution.

In the anode foil production process, valve metal is elongated to form the anode foil, and after forming the enlarged surface layer on the anode foil, the dielectric oxide film is formed on the surface of the enlarged surface layer. In the cathode body production process, valve metal is elongated to form the cathode foil, and the enlarged surface layer on the cathode foil. Furthermore, in the cathode body production process, the carbon layer is formed on the cathode foil, the carbon layer is pressure-welded to the cathode foil by press processing to make the interfacial resistance between the carbon layer and the cathode foil to be 1.8 mΩ·cm$^2$ or less and preferably 1.6 mΩ·cm$^2$ or less.

In the capacitor element production process, the anode foil on which the dielectric oxide film is formed, and a cathode body are laminated via the separator. For the laminated-type capacitor element, the anode foil and the cathode bodies are alternately laminated via the separator for multiple layers. For the wound-type capacitor element, the anode foil and cathode body laminated via the separator is wound. In the solid electrolyte layer formation step, the solid electrolyte layer is formed by impregnating the capacitor element with dispersion in which the conductive polymer is dispersed. In the electrolytic solution impregnation process, the capacitor element on which the solid electrolyte layer is formed by the solid electrolyte layer formation process is impregnated with the electrolytic solution.

By this the electrolytic capacitor with the interfacial resistance between the cathode foil and the carbon layer of 1.8 mΩ·cm$^2$ or less or 1.6 mΩ·cm$^2$ or less can be produced. The decrease over time of the capacity of the electrolytic capacitor can be suppressed.

Hereinafter, the electrolytic capacitor and the production method thereof in the present disclosure will be described in more detail based on the examples. Note that the present disclosure is not limited to the following examples.

Electrolytic capacitors were produced as follow. Firstly, aluminum foil was used as the cathode foil. AC etching process was performed on the aluminum foil to form enlarged surface layers formed by spongy etching pits on both surface of the foil. In the AC etching process, the cathode foil was immersed in acidic aqueous solution with hydrochloric acid having liquid temperature of 25° C. and percent by weight of about 8 wt % as a main electrolyte, and current with alternating current of 10 Hz and current density of 0.14 A/cm² was applied to the substrate for about 5 minutes to enlarge both surface of the aluminum foil.

Next, chemical conversion process was performed on the aluminum foil to form oxide film on the surface of the enlarged surface layer. In the chemical conversion treatment, after chlorine attached in the AC etching process was removed using phosphoric acid aqueous solution, voltage was applied in aqueous solution of ammonium dihydrogenphosphate.

Carbon black was selected as carbon material for the carbon layer of the cathode body. Powder of carbon black, styrene butadiene rubber (SBR) as a binder, and sodium carboxymethyl cellulose (CMC-Na) aqueous solution as aqueous solution containing a dispersing agent were mixed and kneaded to produce a slurry.

This slurry was uniformly applied on the cathode foil. Next, the slurry was heated and dried to volatilize the solvent, and then, press processing was applied to the cathode body. In the press processing, the cathode body was sandwiched by a press roller, and press linear pressure was applied to fix the carbon layer on the cathode foil.

Furthermore, aluminum foil was used as the anode foil. Enlarged surface layer formed by spongy etching pits was formed on both surface of the aluminum foil. In the AC etching process, the cathode foil was immersed in acidic aqueous solution with hydrochloric acid having liquid temperature of 25° C. and percent by weight of about 8 wt % as a main electrolyte, and current with alternating current of 10 Hz and current density of 0.14 A/cm² was applied to the substrate for about 5 minutes. Furthermore, chemical conversion treatment was performed on the anode foil to form dielectric oxide film on the surface of the enlarged surface layer of the anode foil. In the chemical conversion treatment, after chlorine attached in the AC etching process was removed using phosphoric acid aqueous solution, voltage was applied in aqueous solution of adipic acid.

The anode foil and the cathode body were each connected by ultrasonic to a tab-shaped lead terminal formed of aluminum. Then, a separator that had been folded in zigzag was prepared, and the cathode body and the anode foil were alternately sandwiched by each fold to face each other via the separator to produce the laminate of the cathode body, anode foil, and the separator. Regenerated cellulose fiber was used as the separator. Note that the laminate was fixed by imide tape so as not to open.

The laminate was impregnated with the electrolytic solution. The electrolytic solution in which Y-butyrolactone was the solvent and tetramethylimidazolinium phthalate was the solute was added. After impregnating the electrolytic solution, the laminate was sealed in laminate material. Accordingly, the electrolytic capacitor was produced as a laminated cell. Aluminum laminate material with the thickness of 110 μm was used. After the laminated cell was produced, aging process was produced. In the aging process, voltage of 3.35 V was applied under a temperature environment of 105° C. for 60 minutes.

A plurality of such electrolytic capacitors was produced. The cathode body of each electrolytic capacitor had different interfacial resistance between the carbon layer and the cathode foil due to different pressing condition to pressure-weld the carbon layer on the cathode foil. The press linear pressure, the press temperature, and the interfacial resistance for the cathode body of each electrolytic capacitor are shown in the below table 1.

TABLE 1

|  | Press Linear Pressure (kN/cm) | Press Temperature (° C.) | Interfacial Resistance (mΩ · cm²) |
|---|---|---|---|
| Cathode Body 1 | 6 | 150 | 0.87 |
| Cathode Body 2 | 4 | 150 | 0.98 |
| Cathode Body 3 | 8 | 70 | 1.13 |
| Cathode Body 4 | 6 | 70 | 1.38 |
| Cathode Body 5 | 2 | 70 | 1.63 |
| Cathode Body 6 | 4 | 70 | 1.80 |
| Cathode Body 7 | 3 | 70 | 2.21 |
| Cathode Body 8 | 1 | 150 | 2.75 |
| Cathode Body 9 | 1 | 70 | 4.96 |

(Capacitance Test)

The capacity deteriorated over time of each electrolytic capacitor with respective interfacial resistance shown in the table 1 was measured. To measure the capacity, the electrolytic capacitors were exposed under the temperature environment of 125° C. and DC voltage of 2.4 V was applied. Under the temperature environment of 125° C., the initial capacity before applying DC voltage of 2.4 V and the capacity after 750 hours had elapsed were measured. The capacity was measured by transmitting the AC signal of 10 kHz to the electrolytic capacitor. Then, a change rate (ΔCap) of the capacity after 750 hours had elapsed relative to the initial capacity was measured.

The calculation results of the capacity are shown in the below table 2. Also, the results of the table 2 are shown in the graph of FIG. 1. FIG. 1 is a graph indicating the relationship between the interfacial resistance and the change rate of the capacity (ΔCap). In the graph of FIG. 1, the horizontal axis indicates the interfacial resistance and the vertical axis indicates the change rate (ΔCap) of the capacity.

TABLE 2

|  | Interfacial Resistance (mΩ · cm²) | ΔCap (10 kHz) (%) |
|---|---|---|
| Cathode Body 1 | 0.87 | −24.1 |
| Cathode Body 2 | 0.98 | −23.3 |
| Cathode Body 3 | 1.13 | −25.8 |
| Cathode Body 4 | 1.38 | −26.5 |
| Cathode Body 5 | 1.63 | −26.2 |
| Cathode Body 6 | 1.80 | −31.5 |
| Cathode Body 7 | 2.21 | −47.4 |
| Cathode Body 8 | 2.75 | −61.0 |
| Cathode Body 9 | 4.96 | −71.6 |

As shown in the table 2 and FIG. 1, it was observed that, when the interfacial resistance between the carbon layer and the cathode foil was 1.63 mΩ·cm² or less, the decrease in the capacity of the electrolytic capacitor is suppressed to about 26% or less relative to the initial capacity even when load had been applied for 750 hours under a high-temperature environment. In contrast, it was observed that, when the interfacial resistance between the carbon layer and the cathode foil exceeded 1.80 mΩ·cm$^2$, the capacity of the electrolytic capacitor rapidly decreased as the interfacial resistance increased. However, it was observed that when the interfacial resistance between the cathode foil and the carbon layer was up to 1.80 mΩ·cm$^2$, the decrease rate of the capacity of the electrolytic capacitor was suppressed to 30% or less relative to the initial capacity.

Accordingly, it was observed that, when the cathode body of the electrolytic capacitor includes the cathode foil formed of valve metal and the carbon layer laminated on the cathode foil, and making the interfacial resistance between the cathode foil and the carbon layer to be at least 1.6 mΩ·cm$^2$ or less considering errors, the decrease over time of the capacity can be suppressed. In particular, when the adhesion between the cathode foil and the carbon layer was improved by forming the oxide film of about 0.5 to 3 V on the cathode foil, even though it is considered that the decrease rate of the capacity might become large due to the oxide film, by adjusting the interfacial resistance to be 1.6 mΩ·cm$^2$ or less as the present disclosure, the reduction of the capacitance can be suppressed even when the oxide film is formed on the surface of the cathode foil.

Furthermore, by this, it was observed that, when the cathode body of the electrolytic capacitor includes the cathode foil formed of valve metal and the carbon layer laminated on the cathode foil, and by making the interfacial resistance between the cathode foil and the carbon layer to be at least 1.8 mΩ·cm$^2$ or less considering errors, the decrease over time of the capacity can be suppressed to 30% or less relative to the initial capacity.

The invention claimed is:

1. An electrolytic capacitor comprising an anode foil, a cathode body, and electrolytic solution, Wherein:
 the anode foil is formed of valve metal and has a dielectric oxide film formed on a surface thereof,
 the cathode body includes a cathode foil formed of valve metal, an oxide film of 0.5 V to 3 V on the cathode foil, and a carbon layer laminated on the oxide film, and
 an interfacial resistance between the cathode foil and the carbon layer is 1.6 mΩ·cm$^2$ or less.

2. The electrolytic solution according to claim 1, wherein the cathode foil has an enlarged surface layer on a surface thereof and has the carbon layer on the enlarged surface layer.

3. The electrolytic solution according to claim 2, wherein the carbon layer is pressure-welded to the cathode foil.

4. The electrolytic solution according to claim 1, wherein the carbon layer is pressure-welded to the cathode foil.

5. The electrolytic solution according to claim 1, wherein the cathode foil has an enlarged surface layer on a surface thereof and has the carbon layer on the enlarged surface layer.

6. The electrolytic solution according to claim 5, wherein the carbon layer is pressure-welded to the cathode foil.

7. The electrolytic solution according to claim 1, wherein the carbon layer is pressure-welded to the cathode foil.

8. A cathode body of an electrolytic capacitor, comprising:
 a cathode foil formed of valve metal,
 an oxide film of 0.5 V to 3 V on the cathode foil, and
 a carbon layer formed on the oxide film,
 wherein an interfacial resistance between the cathode foil and the carbon layer is 1.6 mΩ·cm$^2$ or less.

9. A manufacturing method of an electrolytic capacitor including an anode foil, a cathode body, and electrolytic solution, comprising:
 a cathode body production process of forming an oxide film of 0.5 V to 3 V on a cathode foil formed of valve metal, and a carbon layer on the oxide film, and pressure-welding the carbon layer to the cathode foil by pressing until an interfacial resistance therebetween becomes 1.6 mΩ·cm$^2$ or less to produce the cathode body;
 a capacitor element production process of arranging the anode foil which a dielectric oxide film is formed on a surface thereof and the cathode body produced in the cathode body production process to face each other to produce a capacitor element; and
 an impregnation process of impregnating the capacitor element with the electrolytic solution.

* * * * *